(12) United States Patent
Dybsetter et al.

(10) Patent No.: US 7,484,133 B2
(45) Date of Patent: Jan. 27, 2009

(54) WATCH-DOG INSTRUCTION EMBEDDED IN MICROCODE

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 577 days.

(21) Appl. No.: 10/704,048

(22) Filed: Nov. 7, 2003

(65) Prior Publication Data

US 2005/0235355 A1    Oct. 20, 2005

(51) Int. Cl.
*G06F 11/00* (2006.01)
(52) U.S. Cl. ........................................... 714/55
(58) Field of Classification Search .................. 714/55, 714/51, 52, 47, 38, 56, 37, 48, 39; 712/216, 712/227
See application file for complete search history.

(56) References Cited

U.S. PATENT DOCUMENTS

| | | | | |
|---|---|---|---|---|
| 4,063,311 A * | 12/1977 | Jeremiah et al. | ............... | 714/25 |
| 4,263,647 A * | 4/1981 | Merrell et al. | ................. | 700/7 |
| 4,835,671 A * | 5/1989 | Sato et al. | ..................... | 700/81 |
| 5,467,922 A * | 11/1995 | Carey et al. | .................... | 236/94 |
| 5,737,212 A * | 4/1998 | Fang et al. | ...................... | 700/1 |
| 5,740,360 A * | 4/1998 | Huckstepp | .................... | 714/50 |
| 6,543,002 B1 * | 4/2003 | Kahle et al. | .................... | 714/10 |
| 6,587,966 B1 * | 7/2003 | Chaiken et al. | ............... | 714/34 |
| 6,697,973 B1 * | 2/2004 | Baumeister et al. | ........... | 714/55 |
| 6,745,321 B1 * | 6/2004 | Floyd et al. | .................. | 712/227 |
| 7,139,937 B1 * | 11/2006 | Kilbourne et al. | ............. | 714/47 |
| 7,222,263 B2 * | 5/2007 | Maier | ........................... | 714/34 |
| 2004/0034816 A1 * | 2/2004 | Richard | ........................ | 714/39 |
| 2004/0225831 A1 * | 11/2004 | Pail et al. | ..................... | 711/105 |

* cited by examiner

*Primary Examiner*—Nadeem Iqbal
(74) *Attorney, Agent, or Firm*—Workman Nydegger

(57) ABSTRACT

Watchdog instructions embedded within the actual microcode that is executed by the processor. Accordingly, as the processor reads and executes the microcode, the processor occasionally encounters the watchdog instruction. Each time the processor executes the watchdog instruction, the processor generates a watchdog signal. A watchdog signal detection circuit detects the presence of the periodic signal. If the watchdog signal has not occurred when expected, then some instability has likely occurred. Accordingly, the watchdog signal detection circuit causes some corrective action to be taken when a watchdog signal is not detected when expected. Such corrective action may include, for example, rebooting the system or resetting one or more modules of the system. The inclusion of the watchdog instruction within the microcode increases the chance that the watchdog signal will be an accurate predictor of system stability.

23 Claims, 3 Drawing Sheets

WATCH-DOG INSTRUCTION EMBEDDED IN MICROCODE

BACKGROUND OF THE INVENTION

1. The Field of the Invention

The present invention relates generally to mechanisms for recovering from a failure in a computing or electronic system using watchdog signals. More particularly, the present invention relates to the generation of watchdog signals using watchdog instructions embedded in microcode that is executed by a processor.

2. Background and Relevant Art

Electronic and computing technology has transformed the way that we work and play. The complexity of such systems facilitates the accomplishment of complex tasks that would not be possible (or at least would be very difficult) without the assistance of the system. While this complexity provides great utility to the user, the complexity can also result in problems.

A common problem is for a system to cease or slow operation due to some encountered instability. For example, two modules or programs may encounter a conflict, or perhaps memory management trouble occurs. In systems in which operational continuity is important, the system is configured to periodically generate watchdog signals which are propagated throughout the system. If the system does not periodically generate the watchdog signal, then the system has likely ceased operation or at least has diminished operation. In that case, the system performs some other operation tending to correct the encountered instability. A typical corrective operation would be to restart the system with a clean state, or reset one or more components of the system.

Occasionally, the system may fail such that watchdog signals are not propagated when there is no instability, thereby causing inappropriate corrective action such as a reboot or reset of a properly running system. Alternatively, the system may improperly propagate watchdog signals when there is an instability warranting corrective action, thereby guaranteeing that correction action is not taken.

Accordingly, what would be advantageous is a mechanism in which watchdog signals are made a more reliable indicator of whether or not the system is experiencing an instability warranting corrective action.

BRIEF SUMMARY OF THE INVENTION

The foregoing problems with the prior state of the art are overcome by the principles of the present invention, which are directed towards one or more watchdog instructions that are embedded within microcode that is executable by one or more processors. As the one or more processors read and execute the microcode, the one or more processors occasionally encounter the watchdog instruction.

Each time a processor executes the watchdog instruction, the processor generates a watchdog signal. A watchdog signal detection circuit detects the presence of the periodic signal. If the watchdog signal has not occurred when expected, then some instability has likely occurred. Accordingly, the watchdog detection circuit causes some corrective action to be taken when a watchdog signal is not detected when expected. Such corrective action may include, for example, rebooting the system or resetting one or more modules of the system.

Embedding the watchdog instructions inside the microcode that governs the operation of the system results in a higher likelihood that the absence of the watchdog signal really means that there is an instability present in the system. Assuming that the processor is truly generating a watchdog signal whenever a watchdog instruction is executed (which is a highly reliable assumption), then the absence of a watchdog instruction for a certain time period means that either the processor has ceased or slowed operating on microcode, or that the microcode has become corrupted to the extent that the watchdog instruction has lost its identity or is not encountered. In any case, instability warranting corrective action has occurred.

Embedding the watchdog instructions inside the microcode that governs the operation of the system results in a higher likelihood that the presence of the watchdog signal really means that the system is stable. After all, the processor will not generate the watchdog signal within an expected period of time unless a watchdog instruction is encountered by the processor at an expected rate. Accordingly, if a watchdog signal is being generated at an expected rate, the processor is functioning, and is progressing stably through the microcode.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for watchdog instructions that are embedded within the actual microcode that is executed by the processor. Accordingly, as the processor reads and executes the microcode, the processor occasionally encounters the watchdog instruction. Each time the processor executes the watchdog instruction, the processor generates a watchdog signal. A watchdog signal detection circuit detects the presence of the periodic signal. If the watchdog signal has not occurred when expected, then some instability has likely occurred. Accordingly, the watchdog signal detection circuit causes some corrective action to be taken when a watchdog signal is not detected when expected. Such corrective action may include, for example, rebooting the system or resetting one or more modules of the system. The inclusion of the watchdog instruction within the microcode increases the chance that the watchdog signal will be an accurate predictor of system stability.

Figure 1:
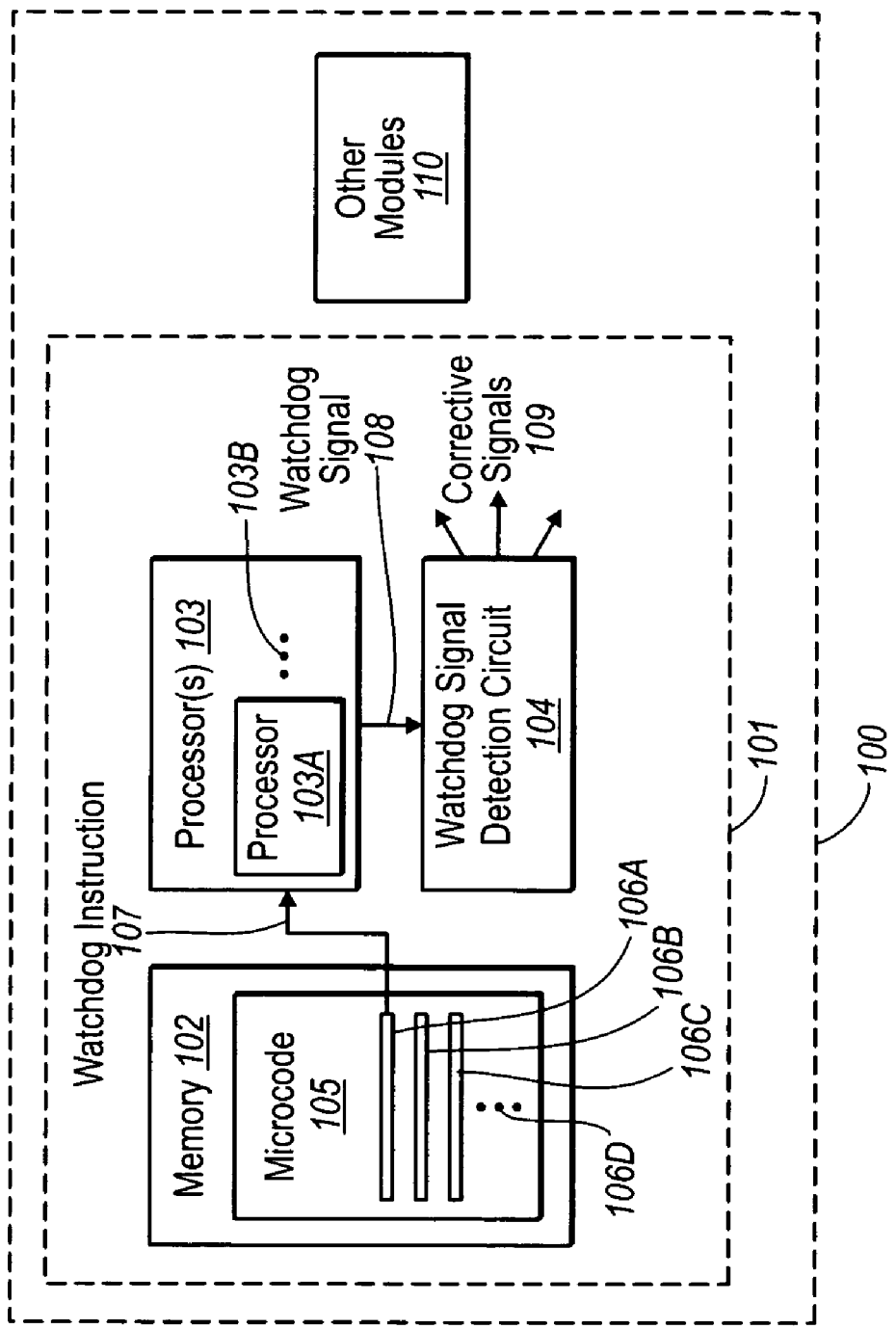
FIG. 1 illustrates an example of system that may incorporate the features of the present invention and through which the watchdog signals may be propagated to verify the proper operation of that system.

Turning to the drawings, FIG. 1 illustrates a suitable electronic or computing system 100 in which the principles of the present invention may be employed. The most basic system configuration is represented by the components within the dashed box 101. As represented within the dashed box 101, system 100 includes a memory module 102, one or more processors 103, and a watchdog signal detection circuit 104.

The memory 102 has thereon microcode 105 that is readable and executable by the one or more processors 103. The memory 102 may be volatile (such a Random Access Memory (RAM)), or may be non-volatile (such as Read Only Memory (ROM), Flash memory, or the like), or a combination of volatile or non-volatile memory. However, the memory 102 may be any memory capable of containing microcode that may be directly or indirectly accessed by the one or more processors 103 for execution. Such processor-readable media may include, but is not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by a processor.

The microcode 105 includes a number of watchdog instructions 106 represented by three watchdog instructions 106A, 106B, 106C among potentially many others as represented by the vertical ellipses 106D. These watchdog instructions are interspersed within other instructions so that the watchdog instructions are periodically executed while the processor is executing the other microcode that directs other aspects of system operation. Each of the instructions may conform to an instruction set that is recognized by the one or more processors 103. There may be any number of watchdog instructions interspersed within the microcode 105.

The one or more processors 103 include at least processor 103A as well as potentially others as represented by the horizontal ellipses 103B. At least one of the processors is capable of accessing the memory 102 to execute the microcode 105 including the watchdog instructions 106. The processor reads the watchdog instruction as represented by the arrow 107. When the processor executes a watchdog instruction, the processor is configured to automatically generate a watchdog signal (as represented by arrow 108), or automatically cause a watchdog signal to be generated by another module of the system.

A watchdog signal detection circuit 104 is configured to detect the occurrence of watchdog signals generated by the processor or the watchdog signals that are caused to be generated by the processor. If a watchdog signal is not detected as expected, the watchdog signal detection circuit 104 takes corrective action, such as rebooting the system 100 or resetting one or more modules within the system 100. The watchdog signal detection circuit 104 may cause corrective action to be taken by, for example, issuing corrective signals 109.

Figure 3:
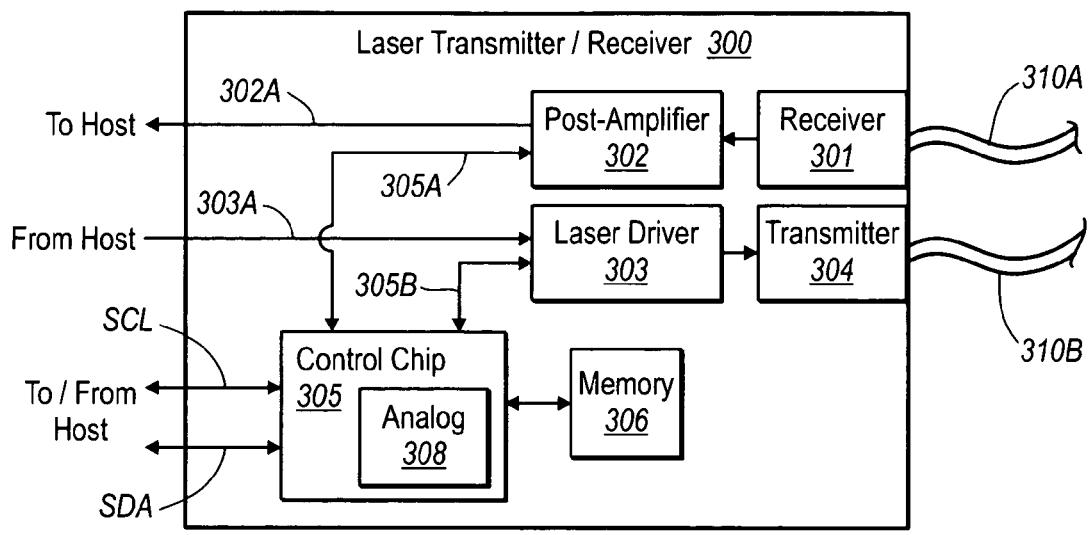
FIG. 3 illustrates a schematic diagram of a laser transmitter/receiver that represents one of many systems in which the principles of the present invention may be employed.

Optionally, there may be other modules 110 within the system 100. Whether or not there are other modules 110, and the nature of the modules 110, will depend on the nature of the system 100. The system 100 may be any electronic or computing system including, but not limited to any general-purpose or special-purpose computing or communications environments or configurations. Examples of well known computing systems, environments, and configurations include, but are not limited to, laser transmitter/receivers, mobile telephones, pocket computers, personal computers, servers, multiprocessor systems, microprocessor-based systems, minicomputers, mainframe computers, and distributed computing environments that include any of the above systems or devices. Any of these example systems are suitable for use with the principles of the present invention If the system 100 was a general-purpose computing system, the other modules 110 may include, for example, video adaptor modules, network interface modules, hard disk drive interfaces, optical disk drive interfaces, magnetic disk drive interfaces, or the like. If the system 100 was a laser transmitter/receiver, the other modules 110 may include laser drivers, analog-to-digital converters, digital-to-analog converters, serial interface controllers, or the like. FIG. 3 illustrates a specific embodiment of a laser transmitter/receiver 300, which will be described in further detail below with respect to FIGS. 3 and 4. However, those of ordinary skill in the art will recognize after having read this disclosure, that the principles of the present invention are not limited to application in a general-purpose computing system, or a laser transmitter/receiver, notwithstanding the detailed description of the laser transmitter/receiver which follows further below.

Figure 2A:
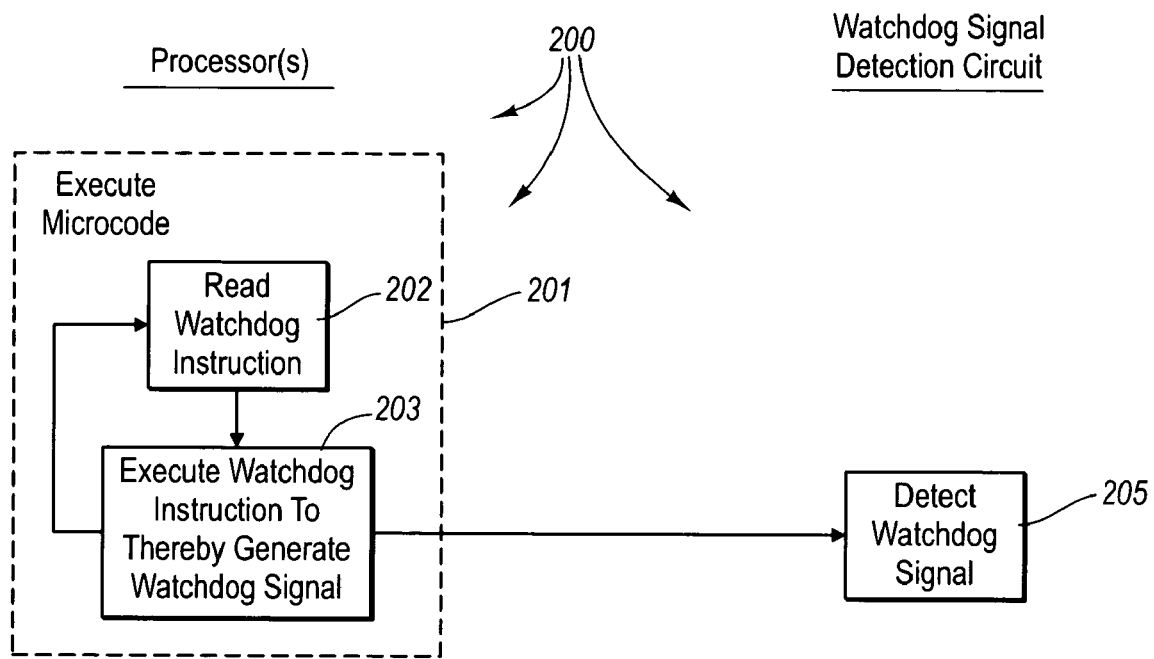
FIG. 2A illustrates a flowchart of a method for a system to use watchdog instructions embedded in microcode to thereby generate watchdog signals during normal operation that are a more reliable indicator of system stability in accordance with the principles of the present invention.

FIG. 2A illustrates a flowchart of a method 200 for using watchdog signals during normal operation as a reliable indicator of system stability in accordance with the principles of the present invention. As the method 200 may be performed by the system 100 of FIG. 1, the method 200 of FIG. 2A will now be described with frequent reference to the system 100 of FIG. 1. Some of the acts of the method are performed by one or more processors (such as one or more processors 103) as represented in the left column of FIG. 2A under the heading "Processor(s)". Other acts are performed by a watchdog signal detection circuit (such as watchdog signal detection circuit 104) as represented in the right column of FIG. 2A under the heading "Watchdog Signal Detection Circuit".

The processor generally processes microcode as represented by the dashed-lined box 201. As the processor is so doing, the processor repeatedly reads a watchdog instruction from a processor-readable media (act 202), and executes the watchdog instruction to thereby cause the processor to generate (or cause to be generated) a watchdog signal (act 203). As long as the processor is generating the watchdog signal to be generated, the watchdog signal detection circuit detects the watchdog signal (act 205).

Figure 2B:
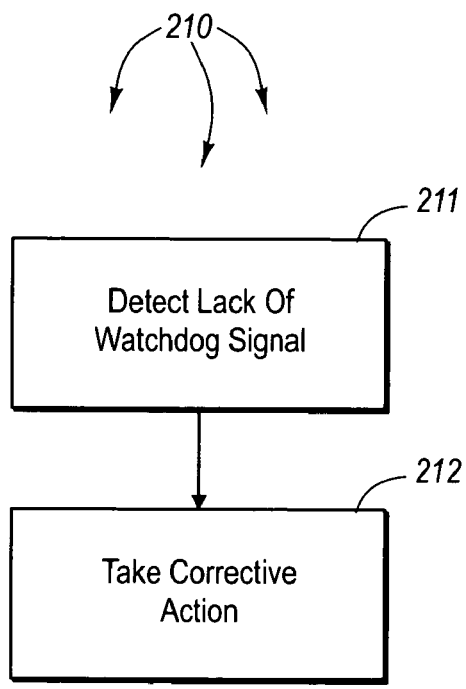
FIG. 2B illustrates a flowchart of a method for the system to operation during abnormal operation in which watchdog signals are not being generated.

FIG. 2B illustrates a flowchart of a method 210 for the watchdog detection circuit to respond to abnormal operation when, for one reason or another, the processor has not generated (or causing to be generated) watchdog signals when expected. This might occur, for example, if the microcode execution ceases or slows down to a certain level. In this case, the watchdog signal detection circuit detects that a watchdog signal has not occurred when expected (act 211), causing the watchdog signal detection circuit to take corrective action (act 212). Such corrective action may include, for example, rebooting the system, or resetting one or more modules within the system.

Embedding the watchdog instructions inside the microcode that governs the operation of the system results in a higher likelihood that the absence of the watchdog signal really means that there is an instability present in the system. Assuming that the processor is truly generating a watchdog signal whenever a watchdog instruction is executed (which is a highly reliable assumption) since this may be mostly or entirely hardware driven, then the absence of a watchdog instruction for a certain time period does mean that either the processor has ceased or slowed operating on any microcode, or that the microcode has become corrupted to the extent that the watchdog instruction has lost its identity or is no longer in the process flow as originally intended. In any case, instability warranting corrective action has occurred.

Embedding the watchdog instructions inside the microcode that governs the operation of the system results in a higher likelihood that the presence of the watchdog signal really means that the system is stable. After all, the processor will not generate the watchdog signal within an expected period of time unless a watchdog instruction is encountered by the processor at an expected rate. Accordingly, if a watchdog signal is being generated at an expected rate, the processor is functioning.

While the principles of the present invention may be implemented in a virtually unlimited variety of architectures, the principles of the present invention are particularly useful where it is important that the system remain operational. Such is the case with laser transmitters/receivers. FIG. 3 illustrates a laser transmitter/receiver 300 in which the principles of the present invention may be employed. While the laser transmitter/receiver 300 will be described in some detail, the laser transmitter/receiver 300 is described by way of illustration only, and not by way of restricting the scope of the invention.

The laser transmitter/receiver 300 receives an optical signal from fiber 310A using receiver 301. The receiver 301 transforms the optical signal to an electrical signal and provides that electrical signal to a post-amplifier 302. The post-amplifier 302 amplifies the signal and provides the amplified signal to the host as represented by arrow 302A.

The laser transmitter/receiver 300 may also receive electrical signals from the host for transmission onto the fiber 310B. Specifically, the laser driver 303 receives the electrical signal as represented by the arrow 303A, and drives the transmitter 304 (i.e., the laser) with signals that cause the transmitter 304 to emit onto the fiber 310B optical signals representative of the information in the electrical signal provided by the host.

The behavior of the receiver 301, the post-amplifier 302, the laser driver 303, and the transmitter 304 may vary dynamically due to a number of factors. For example, temperature changes, power fluctuations, and feedback conditions may each affect the performance of these components. Accordingly, the laser transmitter/receiver 300 includes a control chip 305, which evaluates temperature and voltage conditions, and receives information from the post-amplifier 302 (as represented by arrow 305A) and from the laser driver 303 (as represented by arrow 305B), which will allow the control chip 305 to counteract the dynamically varying performance, and detect when there is a loss of signal.

Specifically, the control chip 305 may counteract these changes by adjusting settings on the post-amplifier 302 and/or laser driver 303 as represented by the arrows 305A and 305B. The control chip 305 has access to a non-volatile memory 306, which in one embodiment, is an Electrically Erasable and Programmable Read Only Memory (EE-PROM). Data and clock signals may be provided from the host to the control chip 305 using the serial clock line SCL, and the serial data line SDA. Also data may be provided from the control chip 305 to the host using serial data signal SDA to allow for digital diagnostics and readings of temperature levels, transmit/receiver power levels, and the like.

The control chip 305 includes both an analog portion 308 and a digital portion. Together, they allow the control chip to implement logic digitally, while still largely interfacing with the rest of the laser transmitter/receiver 300 using analog signals. For example, the analog portion 308 may contain digital to analog converters, and analog to digital converters, high speed comparators (e.g., for event detection), voltage based reset generators, voltage regulators, voltage references, clock generator, and other analog components.

Figure 4:
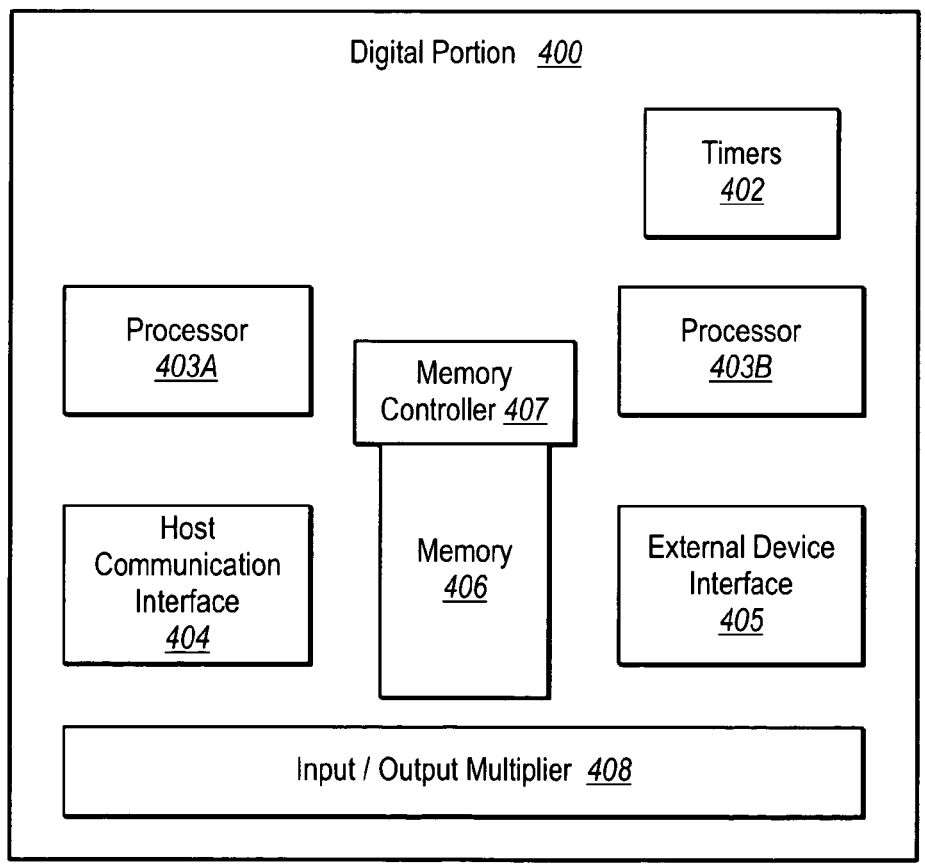
FIG. 4 illustrates a digital portion of the control chip illustrated in FIG. 3, the digital portion including a memory in which the watchdog instructions may be located, and including processors that may respond to such embedded watchdog instructions by generating a watchdog signal.

FIG. 4 illustrates the digital portion 400 of control chip 305 in further detail. For instance, a timer module 402 provides various timing signals used by the digital portion. Such timing signals may include, for example, programmable processor times. The timer module 402 may also act as a watchdog timer that, for example, resets to a particular value when a processor generates a watchdog signal, and then counts down from the value until the next watchdog signal is detected when the value is once again reset to the particular value. Alternatively, if the watchdog timer decrements down to a minimum value, then the watchdog timer module 402 may take corrective action if the watchdog timer would not normally decrement to that value unless the processor had ceased or slowed execution of the microcode. In this sense, the timer module 402 may behave as the watchdog signal detection circuit 104 described above with respect to FIGS. 1 and 2.

Two general-purpose processors 403A and 403B are also included, and are each configured to generate the watchdog signal when encountering a watchdog instruction. In this sense, the processors 403 may behave as the one or more processors 103 described above with respect to FIGS. 1 and 2. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 403A and 403B are each a 16-bit processor and may be identically structured.

A host communications interface 404 is used to communicate with the host using the serial clock line SCL and the serial data line SDA of the laser transmitter/receiver 300. The external device interface 405 is used to communicate with, for example, other modules within the laser transmitter/receiver 300 such as, for example, the post-amplifier 302, the laser driver 303, or the memory 306.

The memory 406 may be Random Access Memory (RAM). The memory control 407 shares access to the memory 406 amongst each of the processors 403A and 403B and with the host communication interface 404 and the external device interface 405. This memory 406 may contain microcode that includes watchdog instructions. Accordingly, the memory 406 may behave as the memory 102 described above with respect to FIGS. 1 and 2.

An input/output multiplexer 408 multiplexes the various input/output pins of the control chip 305 to the various components within the control chip 305. This enables different components to dynamically assign pins in accordance with the then-existing operational circumstances of the chip. Accordingly, there may be more input\output nodes within the control chip 305 than there are pins available on the control chip 305, thereby reducing the footprint of the control chip 305.

Having described a specific environment with respect to FIGS. 3 and 4 in which the principles of the present invention described with respect to FIGS. 1 and 2 may be employed, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secure by United States Letters Patent is:

1. An optical transceiver:
   a control chip including:
      a memory module having stored therein microcode that includes a watchdog instruction, the microcode being adapted to govern operation of the transceiver;
      a processor capable of accessing the memory module to execute the microcode including the watchdog instruction, wherein execution of the microcode results in execution of the watchdog instruction at an expected rate to cause a watchdog signal to be generated at the expected rate; and
      a watchdog signal detection circuit configured to detect the occurrence of watchdog signals at least caused to be generated by the processor, and take corrective action if a watchdog signal does not occur within an expected period of time corresponding to the expected rate;
   a post-amplifier connected to the control chip and to an optical receiver; and
   a laser driver connected to the control chip and to a laser.

2. An optical transceiver in accordance with claim 1, wherein the processor is configured to generate watchdog signals itself when executing watchdog instructions.

3. An optical transceiver in accordance with claim 1, wherein the processor is configured to cause another module in the optical transceiver to generate watchdog signals when executing watchdog instructions.

4. An optical transceiver in accordance with claim 1, wherein at least a portion of the memory module represents volatile memory.

5. An optical transceiver in accordance with claim 1, wherein the processor is a first processor, the optical transceiver further comprising the following:
   a second processor also capable of accessing the memory module to execute the microcode including the watchdog instruction, the second processor being configured to at least cause a watchdog signal to be generated when executing the watchdog instruction.

6. An optical transceiver in accordance with claim 1, wherein the microcode includes a plurality of occurrences of the watchdog instruction.

7. An optical transceiver in accordance with claim 1, wherein the processor is configured to execute instructions that conform to an instruction set that includes the watchdog instruction.

8. An optical transceiver in accordance with claim 1, wherein the corrective action comprises rebooting the system.

9. An optical transceiver in accordance with claim 1, wherein the corrective action comprises resetting one or more modules within the optical transceiver.

10. A processor-readable media in an optical transceiver having stored thereon processor-executable microcode that includes instructions that conform to an instruction set, the instructions comprising the following:
    watchdog instructions that, when executed by a processor, cause the processor to cause a watchdog signal to be periodically generated that may be detected by a watchdog detection circuit; and
    other instructions that, when executed by the processor, cause the processor to perform other actions that govern operation of the optical transceiver,
    wherein the watchdog instructions are interspersed within the other instructions so that the watchdog instructions are periodically executed while the processor is executing the other instructions.

11. A processor-readable media in accordance with claim 10, wherein the processor is configured to generate watchdog signals itself when executing the watchdog instructions.

12. A processor-readable media in accordance with claim 10, wherein the processor is configured to cause another module in the optical transceiver to generate watchdog signals when executing the watchdog instructions.

13. A processor-readable media in accordance with claim 10, wherein at least a portion of the processor-readable media represents volatile memory.

14. A method for detecting instability in an optical transceiver, the method comprising the following:
    an act of a processor reading a watchdog instruction from a processor-readable media, the watchdog instruction being encountered by the processor at an expected rate;
    an act of the processor executing the watchdog instruction to thereby cause the processor to cause a first watchdog signal to be generated;
    an act of a watchdog signal detection circuit detecting the first watchdog signal;
    an act of the watchdog signal detection circuit subsequently detecting that a subsequent watchdog signal has not occurred when expected;
    an act of the watchdog signal detection circuit causing corrective action to be taken in response to detecting that the subsequent watchdog signal has not occurred when expected; and
    an act of the processor reading and executing a non-watchdog instruction from the processor-readable media, the non-watchdog instruction being executed to carry out an action that governs a communication operation of the optical transceiver.

15. A method in accordance with claim 14, wherein the act of the processor executing the watchdog instruction to thereby cause the processor to at least cause the first watchdog signal to be generated comprises the following:
    an act of the processor executing the watchdog instruction to thereby cause the processor to directly generate the watchdog signal.

16. A method in accordance with claim 14, wherein the act of the processor executing the watchdog instruction to thereby cause the processor to at least cause the first watchdog signal to be generated comprises the following:

an act of the processor executing the watchdog instruction to thereby cause the processor to instruct another module to generate the watchdog signal.

17. A method in accordance with claim 14, wherein at least a portion of the processor-readable media represents volatile memory.

18. A method in accordance with claim 14, wherein the processor is configured to execute instructions that conform to an instruction set that includes the watchdog instruction.

19. A method in accordance with claim 14, wherein the act of the watchdog signal detection circuit causing corrective action to be taken comprises an act of causing one or more modules within the system to be reset.

20. An optical transceiver in accordance with claim 1, wherein the watchdog instruction is encountered by the processor at the expected rate.

21. An optical transceiver in accordance with claim 1, wherein the watchdog instruction is embedded in the microcode.

22. A method in accordance with claim 14, wherein generation of the watchdog signal does not necessarily correspond to execution of any instruction other than the watchdog instruction.

23. An optical transceiver in accordance with claim 1, wherein the second processor is identical to the first processor.

* * * * *